(12) United States Patent
Lee et al.

(10) Patent No.: US 9,188,753 B2
(45) Date of Patent: Nov. 17, 2015

(54) OPTICAL CONNECTOR ASSEMBLY

(71) Applicant: Intel Corporation, Santa Clara, CA (US)

(72) Inventors: Simon S. Lee, San Jose, CA (US); Brian H. Kim, Fremont, CA (US); Jennie Lou H. De Quinto, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,997

(22) PCT Filed: Mar. 12, 2013

(86) PCT No.: PCT/US2013/030603
§ 371 (c)(1),
(2) Date: Jun. 25, 2013

(65) Prior Publication Data
US 2014/0270655 A1 Sep. 18, 2014

(51) Int. Cl.
G02B 6/36 (2006.01)
G02B 6/43 (2006.01)
G02B 6/42 (2006.01)

(52) U.S. Cl.
CPC ............... *G02B 6/43* (2013.01); *G02B 6/4284* (2013.01)

(58) Field of Classification Search
CPC ................. G02B 6/43; G02B 6/4284
USPC ............... 385/89, 93; 439/266; 710/100
See application file for complete search history.

(56) References Cited

U.S. PATENT DOCUMENTS

| 4,804,243 | A | * | 2/1989 | Borsuk et al. | 385/76 |
| 4,890,894 | A | * | 1/1990 | Kwa | 385/56 |
| 5,138,679 | A | * | 8/1992 | Edwards et al. | 385/90 |
| 5,416,872 | A | * | 5/1995 | Sizer et al. | 385/92 |
| 7,325,303 | B2 | * | 2/2008 | Boggs et al. | 29/874 |
| 2006/0098923 | A1 | * | 5/2006 | Fujiwara et al. | 385/88 |
| 2007/0082512 | A1 | * | 4/2007 | Boggs et al. | 439/66 |

FOREIGN PATENT DOCUMENTS

| TW | M379268 U | 4/2010 |
| TW | 201300855 A | 1/2013 |
| TW | 201306436 A | 2/2013 |

OTHER PUBLICATIONS

TW Office Action for TW Application No. 103106270, issued Jul. 14, 2015, 12 pages.

* cited by examiner

*Primary Examiner* — Peter Radkowski
(74) *Attorney, Agent, or Firm* — Schwabe Williamson & Wyatt PC

(57) ABSTRACT

Methods, apparatuses, and systems related to optical connector assemblies are described. In some embodiments, the connector assemblies may include an optical assembly, having an optical interconnect and an optical module, to be coupled with a host electrical connector. The connector assembly may further include springs, disposed on the optical interconnect or the host electrical connector, to facilitate a coupling of the optical interconnect with the optical module. Other embodiments are described and claimed.

6 Claims, 8 Drawing Sheets

(a)

(b)

(c)

OPTICAL CONNECTOR ASSEMBLY

GOVERNMENT INTEREST

This invention was made with Government support under contract number H98230-10-9-0021 awarded by the Department of Defense. The Government has certain rights in this invention.

CROSS REFERENCE TO RELATED APPLICATION

The present application is a national phase entry under 35 U.S.C. §371 of International Application No. PCT/US2013/030603, filed Mar. 12, 2013, entitled "OPTICAL CONNECTOR ASSEMBLY," which designates, among the various States, the United States of America, and the entire contents and disclosures of which are hereby incorporated by reference in their entireties.

FIELD

Embodiments of the present invention relate generally to optical communication and, more particularly, to optical connector assemblies used for such optical communications.

BACKGROUND

Current optical assemblies typically include a fiber connector, a connector latch, and an optical module. The fiber connector and the optical module are fastened by the connector latch. The optical assembly is then connected to an electrical connector to provide a connector assembly. If the alignment of the fiber connector and lens of the optical module is disturbed, the power levels of the optical signal may change and adversely effect communications passing through the connector assembly.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

Embodiments of a connector assembly having a spring to securely couple an optical connector and an optical module are described. Various related components, methods, and systems are also described.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous.

For the purposes of the present invention, the phrase "A or B" means "(A), (B), or (A and B)".

Figure 1:
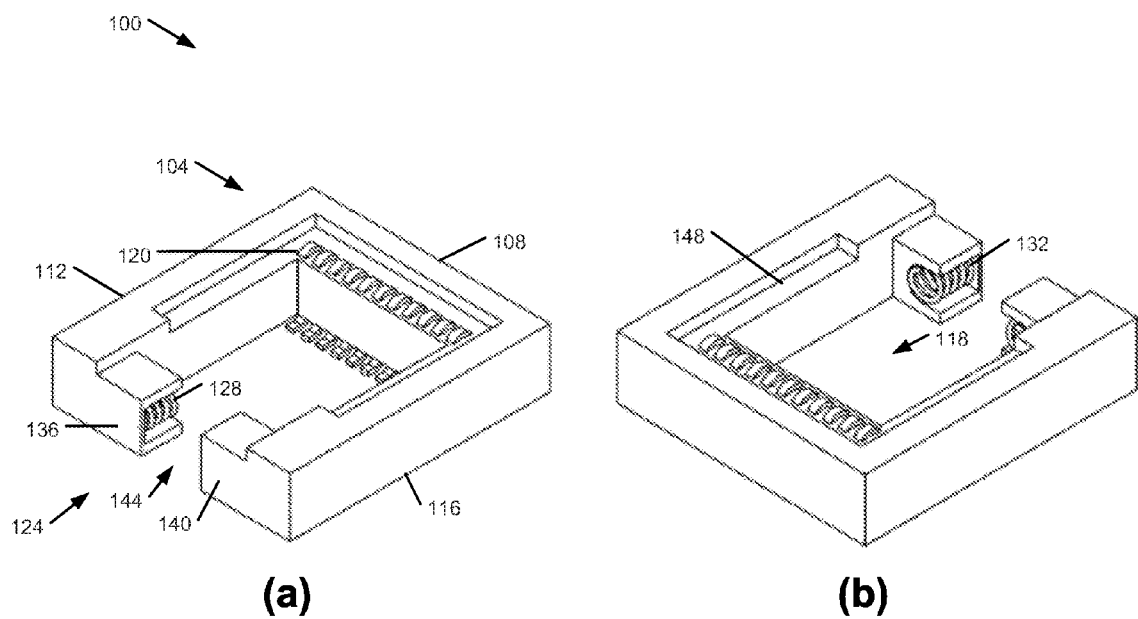
FIGS. 1(a)-(b) illustrate various perspective views of a host electrical connector in accordance with various embodiments.

FIGS. 1(a) and (b) are perspective views of a host electrical connector 100 in accordance with some embodiments. The host electrical connector 100 may include a frame 104 with a first side 108, a second side 112, and a third side 116. The second side 112 and third side 116 may be adjacent to the first side 108 as shown. An opening 118 may be defined by the sides 108, 112, and 116.

The first side 108 may house, on its interior portion, a plurality of electrical connections 120. The electrical connections 120 are shown on both top and bottom; however, in other embodiments they may be disposed in other configurations, for example, solely on the top or solely on the bottom.

The frame 104 may further include a securing mechanism 124 configured to secure coupling of various components within the host electrical connector 100. The securing mechanism 124 may include springs 128 and 132 disposed in respective extensions 136 and 140. The extensions 136 and 140 are arranged parallel to the first side 108. The springs 128 and 132, when loaded, may provide a force toward the plurality of electrical connections 120 on the first side 108. A passage 144 may be disposed between terminal ends of the extensions 136 and 140.

The frame 104 may include a recess 148. The recess 148 may be formed in the interior edges of the sides 108, 112, and 116. At least some of the electrical connections 120 may be disposed in a portion of the recess 148.

Figure 2:
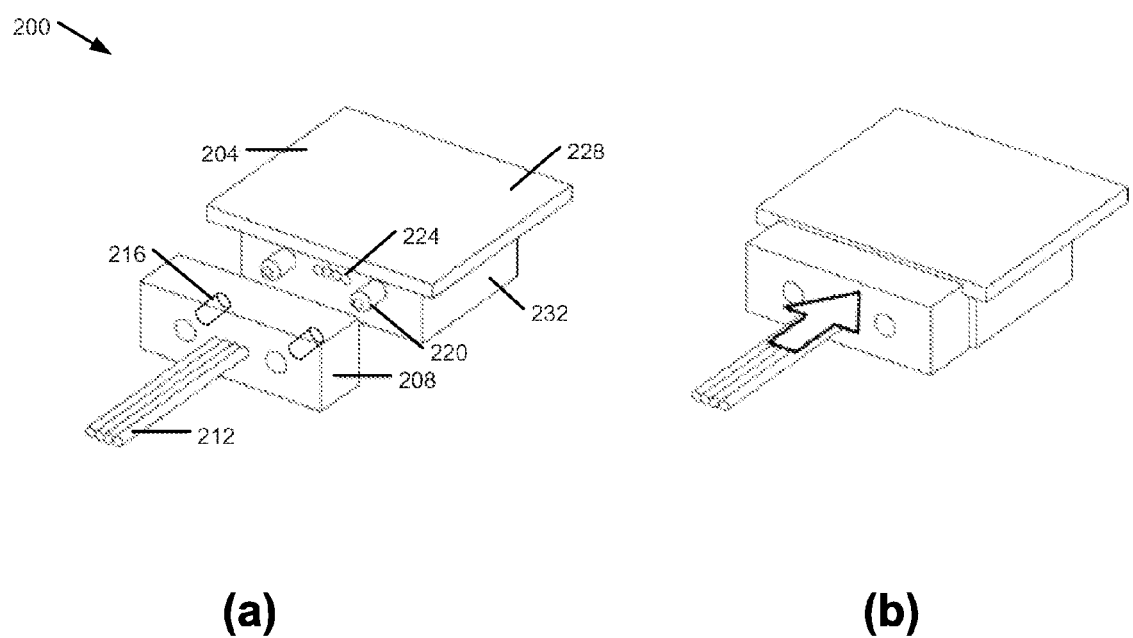
FIGS. 2(a)-(b) respectively illustrate exploded and combined views of an optical assembly in accordance with various embodiments.

FIGS. 2(a) and (b) respectively illustrate exploded and combined views of an optical assembly 200. The optical assembly 200 may include an optical module 204, which provides an optical-electrical interface, and an optical connector 208.

The optical connector 208 may house terminal ends of optical fibers 212. The optical connector 208 may include recesses 216 that facilitate alignment and coupling of the optical connector 208 with the optical module 204.

Figure 3:
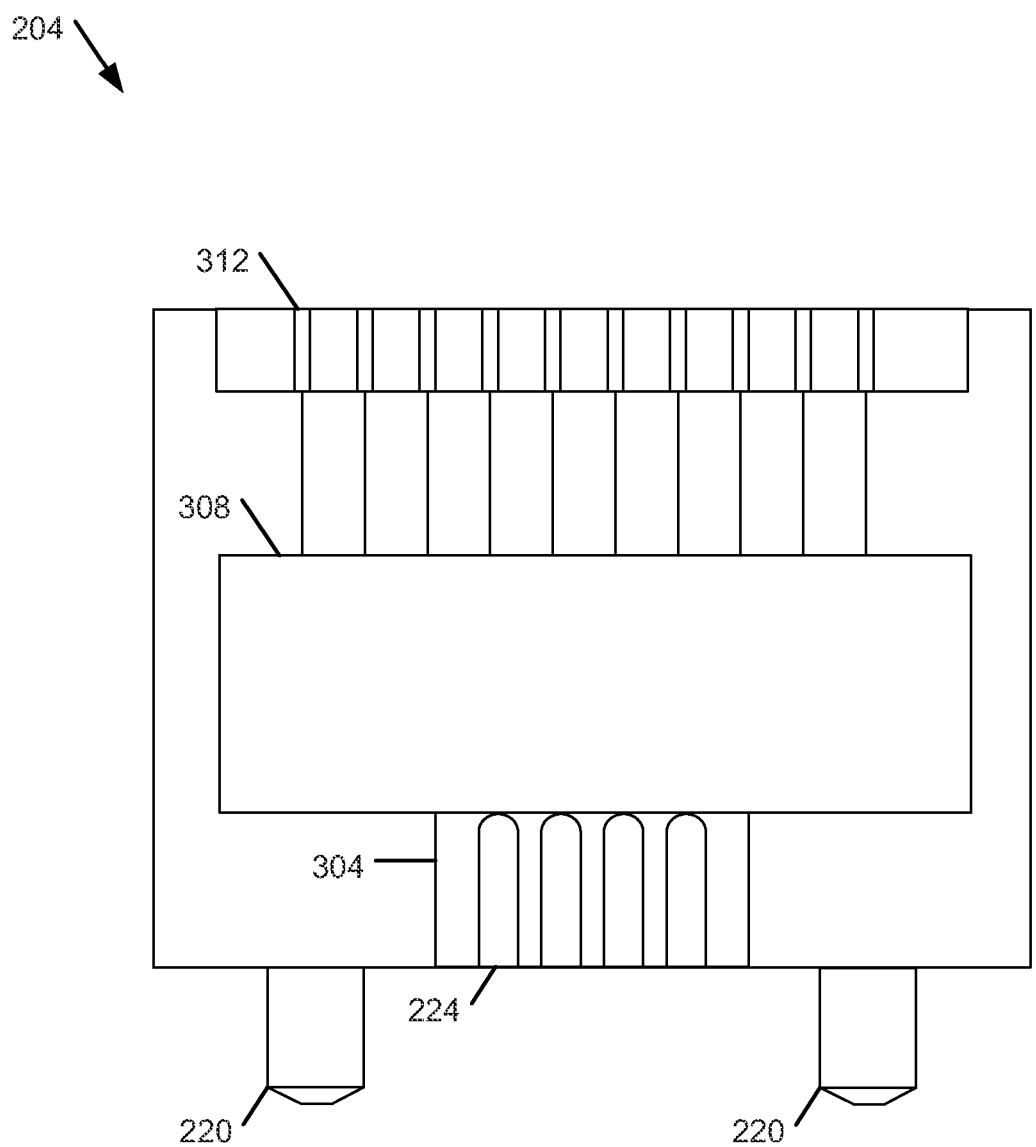
FIG. 3 illustrates a schematic of an optical module in accordance with various embodiments.

The optical module 204, which is also shown schematically in FIG. 3, may include posts 220 that correspond with the recesses 216. When the optical connector 208 is coupled with the optical module 204, as shown in FIG. 2(b), the posts 220 are received in the recesses 216, which aligns the terminal ends of the optical fibers 212 with optical elements 224 of an optical lens 304 of the optical module 204.

The optical lens 304 may be coupled with, and provide an optical interface to, a converter 308 that is configured to convert signals between optical transmissions, communicated through the optical elements 224, and electrical transmissions. The electrical transmissions may be communicated through electrical connectors 312 coupled with, and configured to provide an electrical interface to, the converter 308.

The optical module 204 may also include a top plate 228 that provides an overhang with respect to a module housing 232. The module housing 232 may house various components of the optical module 204, for example, the optical lens 304, converter 308, and electrical connectors 312.

Figure 4:
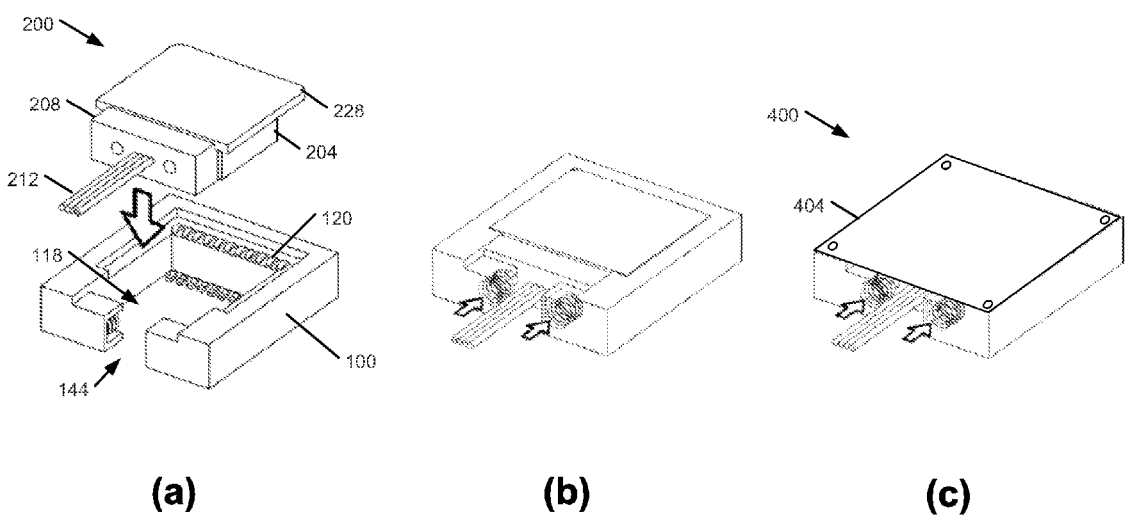
FIGS. 4(a)-(c) illustrate exploded and combined views of a connector assembly in accordance with various embodiments.

FIGS. 4(a)-(c) illustrate the coupling of the optical assembly 200 with the host electrical connector 100 into a connector assembly 400 in accordance with some embodiments.

The optical assembly 200 may be vertically inserted into the opening 118, as shown in FIG. 4(a), with the optical fibers 212 disposed in the passage 144, as shown in FIG. 4(b). The optical assembly 200 may be vertically inserted into the opening 118 at an angle to compress and load the springs 128 and 132. The springs 128 and 132, when loaded, may provide a force in the direction of the electrical connections 120. This may provide a secure coupling of the optical connector 208 with the optical module 204, ensuring that the alignment between the elements 224 and the optical fibers 212 is not disturbed. This may be done without external latches, or associated large package dimensions, relied upon in current optical assemblies to secure an optical connector to an optical module.

Utilizing the springs 128 and 132 to secure the coupling of the optical assembly 200 within the host electrical connector 100 may also provide various design and manufacturing advantages. For example, one host electrical connector 100 may accommodate optical assemblies having different form factors without any rework or disassembly of the components. This may provide a flexible and scalable host electrical connector design.

When the optical assembly 200 is seated in the host electrical connector 100, a top surface of the top plate 228 may be flush with top surfaces of sides 108, 112, and 116. A plate 404 may be secured over the top of the connector assembly 400 to secure the optical assembly 200 in place.

Figure 5:
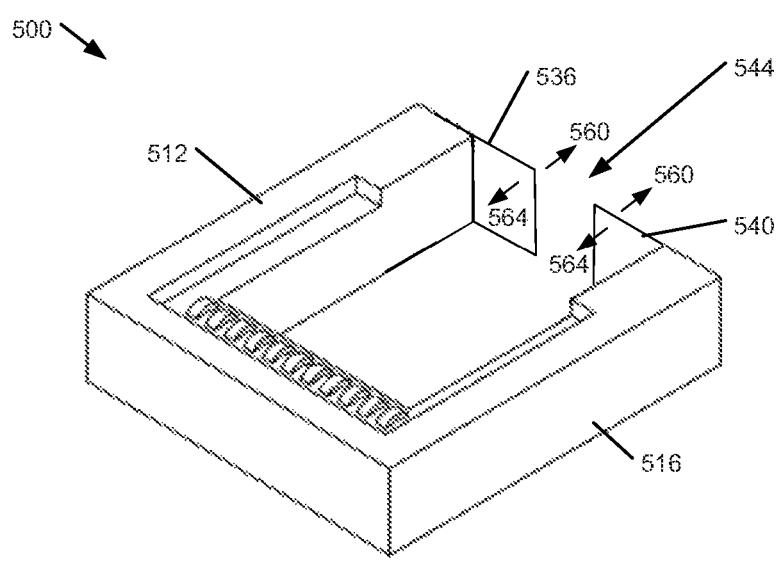
FIG. 5 illustrates a host electrical connector in accordance with various embodiments.

FIG. 5 illustrates a host electrical connector 500 in accordance with some embodiments. The host electrical connector 500 may be similar to, and substantially interchangeable with, host electrical connector 100 except for noted differences.

The host electrical connector 500 may include extensions 536 and 540. Similar to extensions 136 and 140, the extensions 536 and 540 may extend from respective sides 512 and 516 and may define a passage 544 by their terminal ends. However, extensions 536 and 540 may be the springs that are configured to provide the compressive forces provided by springs 128 and 132. That is, when the extensions 536 and 540 are deflected in an outward direction, indicated by arrows 560, they may be loaded and, therefore, provide a reactive force in an inward direction, indicated by arrows 564.

Figure 6:
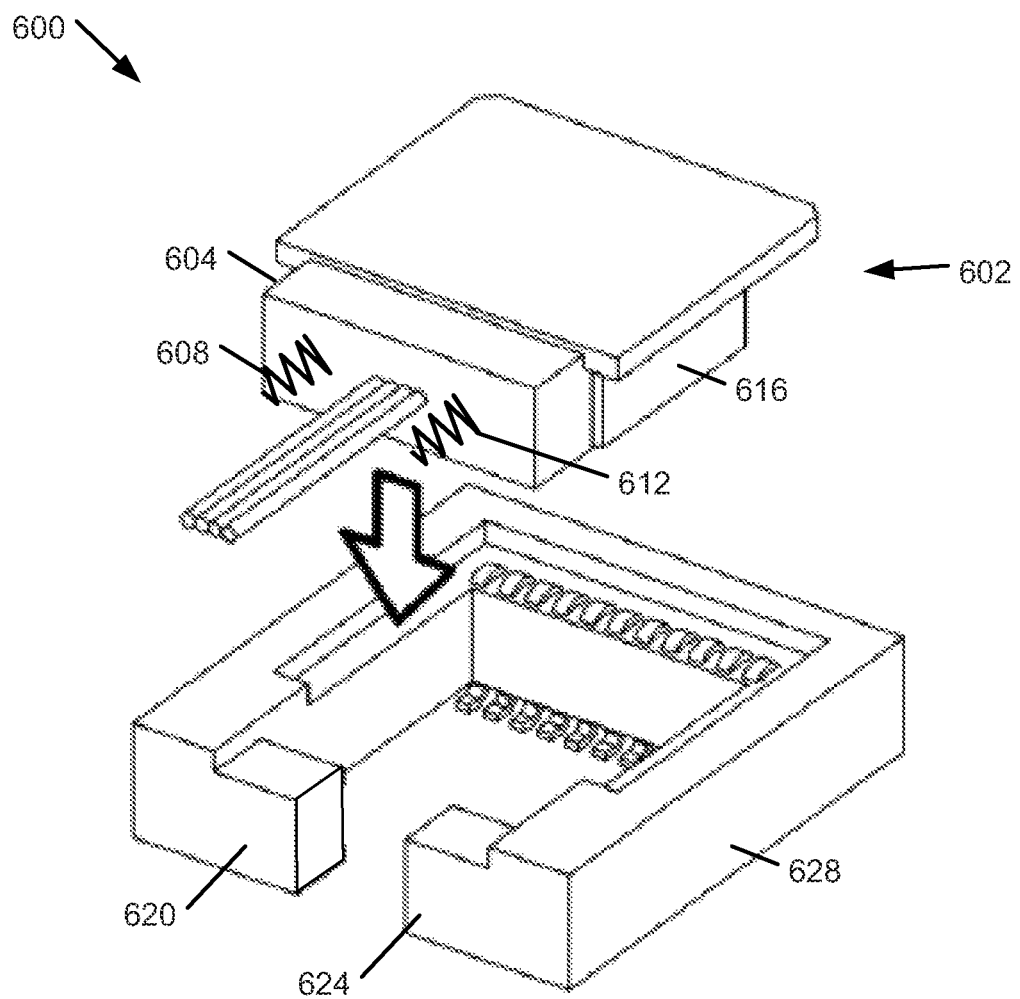
FIG. 6 illustrates an exploded view of a connector assembly in accordance with various embodiments.

In other embodiments, other types of springs and extensions may be used consistent with the teachings of the present disclosure. For example, FIG. 6 illustrates a partially exploded perspective view of a connector assembly 600 in accordance with some embodiments.

The connector assembly 600 may be similar to, and substantially interchangeable with, connector assembly 400 except for noted differences. In particular, the optical assembly 602 of the connector assembly 600 may include an optical connector 604 having springs 608 and 612 disposed on a surface that is opposite the surface at which the optical connector 604 is coupled with an optical module 616.

As the springs are included on the optical connector 604, springs may not be included on extensions 620 and 624 of a host electrical connector 628. The springs 608 and 612 may serve a similar function as springs 128 and 132 discussed above.

Figure 7:
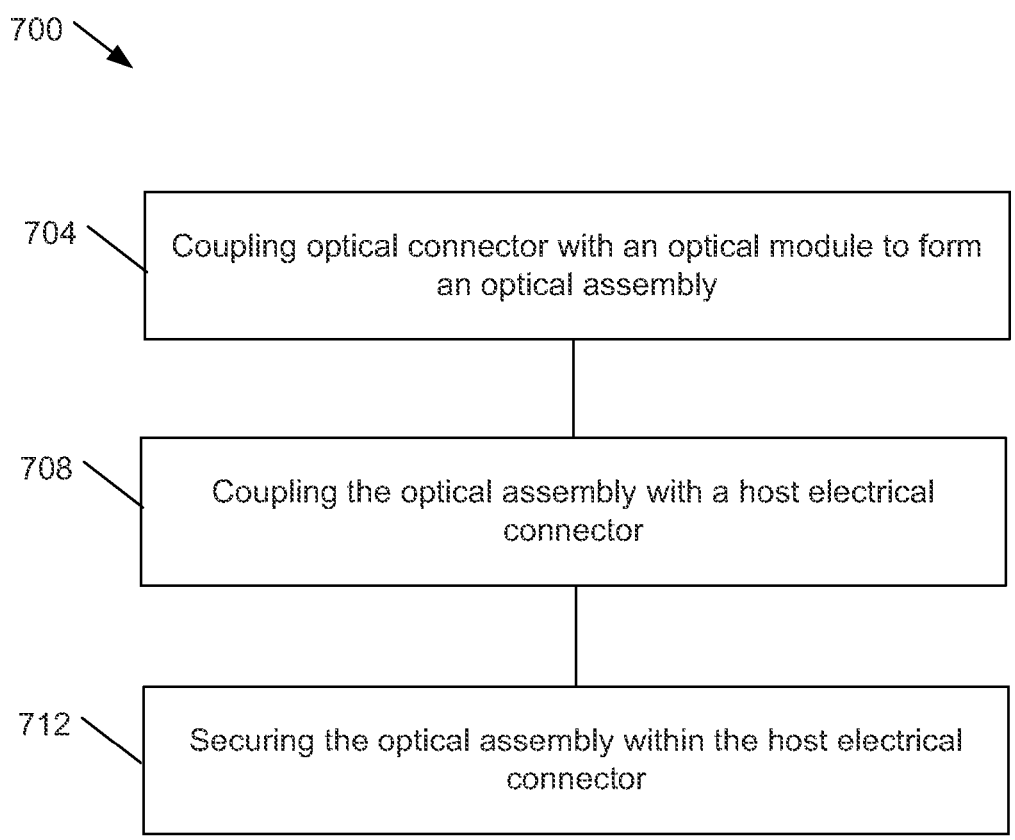
FIG. 7 is a flowchart depicting an assembly operation in accordance with various embodiments.

FIG. 7 is a flowchart depicting an assembly method 700 in accordance with some embodiments. The assembly method 700 may be used to assemble a connector assembly such as connector assemblies 400 or 600.

The assembly method 700 may include, at 704, coupling an optical connector with an optical module to form an optical assembly such as optical assemblies 200 or 602. The coupling of the optical connector with an optical module may include aligning posts with respective recesses and pushing the two components together. In various embodiments, the coupling at 704 may include a frictional coupling provided by the posts and the recesses, and may not include a latch coupling of the two components.

The assembly method 700 may include, at 708, coupling the optical assembly with a host electrical connector such as host electrical connector 100, 500, or 628. The coupling at 708 may include vertically inserting the optical assembly into an opening of the host electrical connection. This inserting may include loading springs included on the host electrical connector or the optical assembly.

The assembly method 700 may further include, at 712, securing the optical assembly within the host electrical connector. The securing of the optical assembly within the host electrical connector may be done by the loaded springs pressing the optical assembly toward electrical connections of the host electrical connector. The securing of the optical assembly within the host electrical connector may be further done by securing a plate over the tope of the optical assembly.

Figure 8:
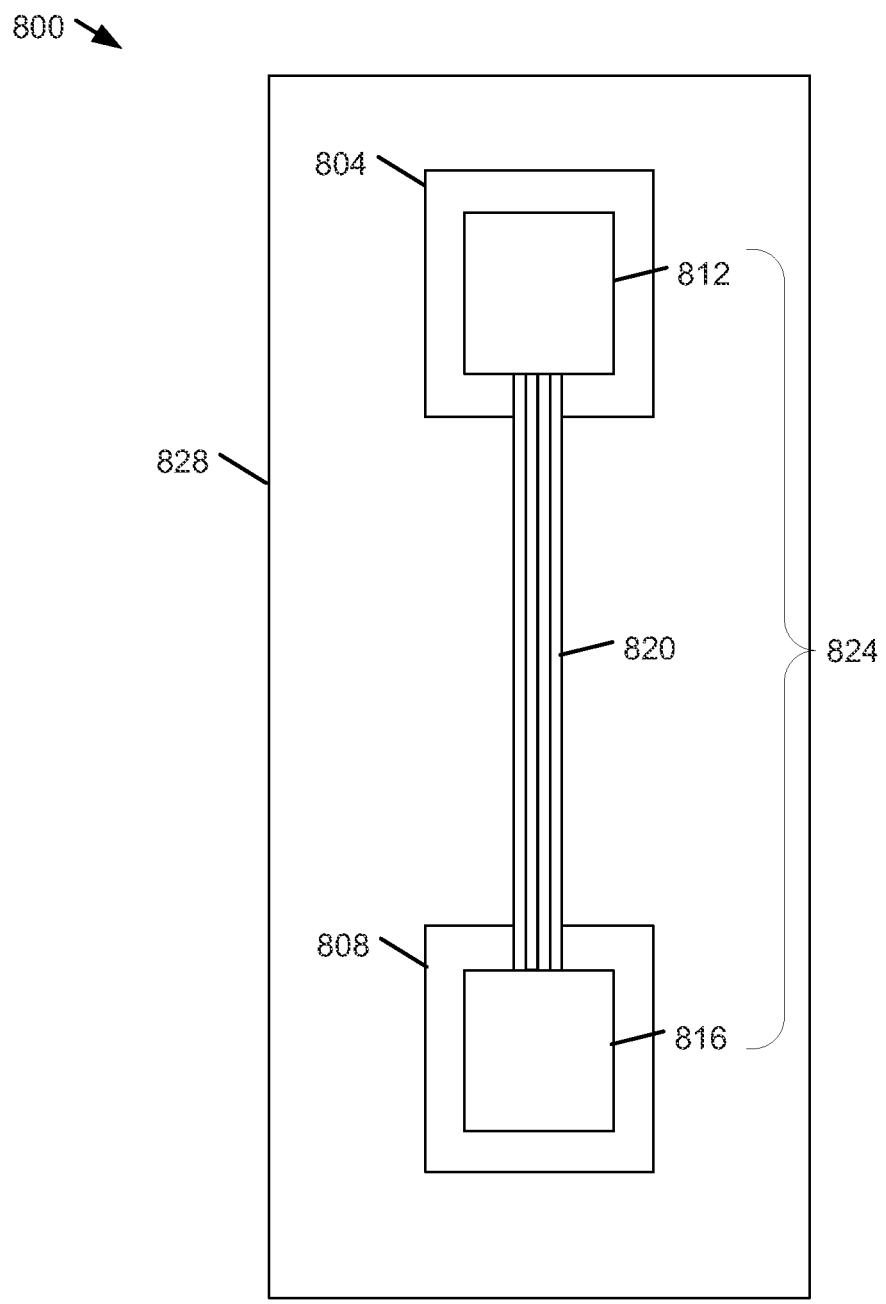
FIG. 8 is a block diagram of an exemplary system in accordance with various embodiments.

FIG. 8 illustrates a system 800 in accordance with various embodiments. The system 800 may include a first electrical component 804 coupled with a second electrical component 808 through respective connector assemblies 812 and 816. The connector assemblies 812 and 816 may be communicatively coupled with one another by a plurality of optical fibers 820. The connector assemblies 812 and 816 may be similar to connector assemblies 400 or 600 described above.

In some embodiments, the system 800 may be a processor-based system with the first electrical component 804 and the second electrical component 808 being processing components. The connector assemblies 812 and 816 and the optical fibers 820 may provide an interconnect device 824 that communicatively couples the first and second electrical components 804 and 808. The interconnect device 824 may allow high-speed data transfers to facilitate processing operations of the first and second electrical components 804 and 808. In various embodiments, the first and second electrical components 804 and 808 may be, but are not limited to, single or multi-core processors such as a central processing unit, core logic processor, communication processor, graphics processor, input/output processor, memory processor, etc.

In some embodiments, the first and second electrical components 804 and 808 may be disposed in a common housing 828, with the interconnect device 824 providing for local communications. The first and second electrical components 804 and 808 may be disposed on a common circuit board, e.g., a motherboard, or on different circuit boards, e.g., a motherboard, a daughterboard, an expansion card, etc.

In some embodiments, the system 800 may be a server or a workstation employed in, e.g., a telecommunications or data center application.

Various embodiments describe a host electrical connector comprising: a plurality of electrical connections; a frame having: a first side housing the plurality of electrical connections on an interior portion of the first side; a second side adjacent to the first side; a third side adjacent to the first side, wherein the first, second, and third sides define an opening to receive an optical assembly; and a spring to provide a force, when loaded, toward the plurality of electrical connections.

The host electrical connector may further comprise an extension extending from the second side parallel with the first side, wherein the spring is coupled with the extension. The extension may be a first extension, the spring is a first spring, and the frame may further comprise: a second extension extending from the third side parallel with the first side; and a second spring coupled with the second extension to provide a force, when loaded, toward the plurality of electrical connections. A passage between terminal ends of the first and second extensions may accommodate optical fibers of an optical assembly disposed in the opening.

In some embodiments, the spring comprises an extension extending from the second side.

The frame may comprise a recess in interior edges of the first, second, and third sides to seat an optical assembly in a manner such that a surface of a seated optical assembly is flush with surfaces of the first, second, and third sides. A plate may secure a seated optical assembly in the recess.

Some embodiments describe an optical assembly comprising: an optical connector housing terminal ends of one or more optical fibers, the optical connector having one or more recesses; and an optical module including: a converter to convert signals between optical transmissions and electrical transmissions; an optical lens configured to align with the terminal ends of the one or more optical fibers, the optical lens coupled with the converter to provide an optical interface to the converter; a plurality of electrical connectors coupled with the converter to provide an electrical interface to the converter; and one or more posts to respectively align with the one or more recesses to couple the optical connector with the optical module. The optical connector may be coupled with the optical module without an external latch.

The optical assembly may be disposed within an opening of a host electrical connector in a manner to secure coupling of the optical connector with the optical module.

One or more springs may be coupled with a first surface of the optical connector, the first surface opposite a second surface that is coupled with the optical module, the one or more springs configured to provide a force to securely couple the optical connector with the optical module when the optical assembly is disposed within an opening of a host electrical connector.

Some embodiments describe a connector assembly comprising: a host electrical connector having: a plurality of electrical connections; and a frame with: a first side housing the plurality of electrical connections on an interior portion of the first side; a second side adjacent to the first side; and a third side adjacent to the first side, wherein the first, second, and third sides define an opening; and an optical assembly having: an optical module to provide an optical-electrical interface; and an optical connector housing terminal ends of one or more optical fibers, the optical connector coupled with the optical module; and one or more springs to provide a force to secure coupling of the optical module with the optical connector when the optical assembly is disposed within the opening. The one or more springs may be disposed on a first surface of the optical connector, the first surface opposite a second surface of the optical connector to which the optical module is coupled; or on the frame.

In some embodiments, the frame further comprises: a first extension coupled with the second side; and a first spring of the one or more springs is coupled with the first extension. The frame may further comprise: a second extension coupled with the third side; and a second spring of the one or more springs is coupled with the second extension.

In some embodiments, the frame further comprises: a first extension coupled with the second side, wherein the first extension comprises a first spring of the one or more springs. The frame may further comprise: a second extension coupled with the third side, wherein the second extension comprises a second spring of the one or more springs.

Some embodiments describe a computing system comprising: a first electrical component; a second electrical component; an interconnect device communicatively coupling the first electrical component with the second electrical component, the interconnect device including: a plurality of optical fibers; a host electrical connector having an opening; an optical assembly disposed in the opening, the optical assembly having: an optical connector housing terminal ends of the plurality of optical fibers; and an optical module; and one or more springs to securely couple the optical connector with the optical module when the optical assembly is disposed within the opening.

The one or more springs may be disposed on a frame of the host electrical connector or the optical connector.

The first and second electrical components, which may be first and second processors, may be disposed in a common housing.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A connector assembly comprising:
    a host electrical connector having
    a frame that includes:
        a first side to house a plurality of electrical connections on an interior portion of the first side;
        a second side adjacent to the first side, wherein the second side includes a first extension coupled with the second side and disposed parallel to the first side, wherein the first extension is associated with a first spring, wherein the first spring in a first loaded state is to provide a first force directed toward the plurality of electrical connections; and
        a third side adjacent to the first side opposite the second side, wherein the third side includes a second extension coupled with the third side and disposed parallel to the first side, wherein the second extension is associated with a second spring, wherein the second spring in a second loaded state is to provide a second force directed toward the plurality of electrical connections wherein the second and third sides with respective first and second extensions define an opening; and an optical assembly insertable into the host electrical connector at least partially through the opening, wherein the optical assembly includes:

an optical module to provide an optical-electrical interface with the electrical connections of the host electrical connector; and an optical connector coupled with the optical module, wherein the optical connector is to house terminal ends of one or more optical fibers; and wherein the optical assembly, when inserted into the host electrical connector, is to load the first and second springs to provide a force comprising the first and second forces directed toward the plurality of electrical connections, to secure coupling of the optical module with the optical connector when the optical assembly is disposed within the opening in response to the insertion, wherein one of the optical module or electrical connector includes one or more posts to be received by respective one or more recesses disposed respectively in the optical connector or the optical module to provide the coupling of the optical module with the optical connector, wherein the one or more posts are disposed in a plane that is parallel to a direction of the force provided by the first and second springs.

2. The connector assembly of claim 1, wherein the first and second springs are disposed on the frame.

3. The connector assembly of claim 2, wherein the first spring is coupled with the first extension.

4. The connector assembly of claim 3, wherein the second spring is coupled with the second extension.

5. The connector assembly of claim 2, wherein the first extension comprises the first spring.

6. The connector assembly of claim 5, wherein the second extension comprises the second spring.

* * * * *